Patented Mar. 28, 1950

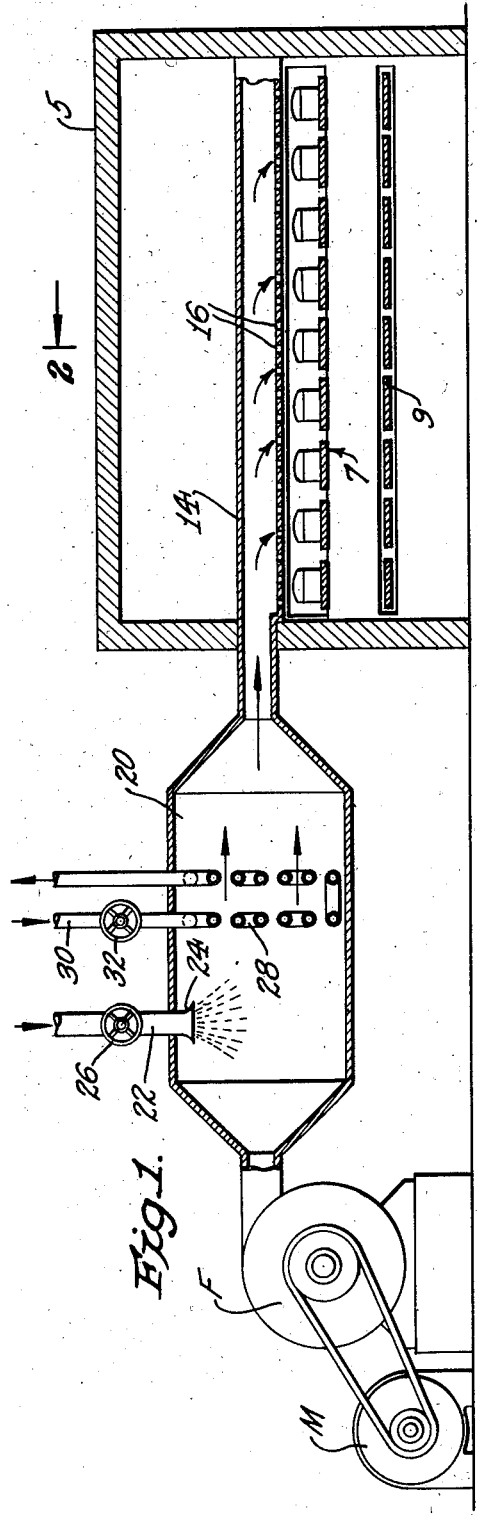
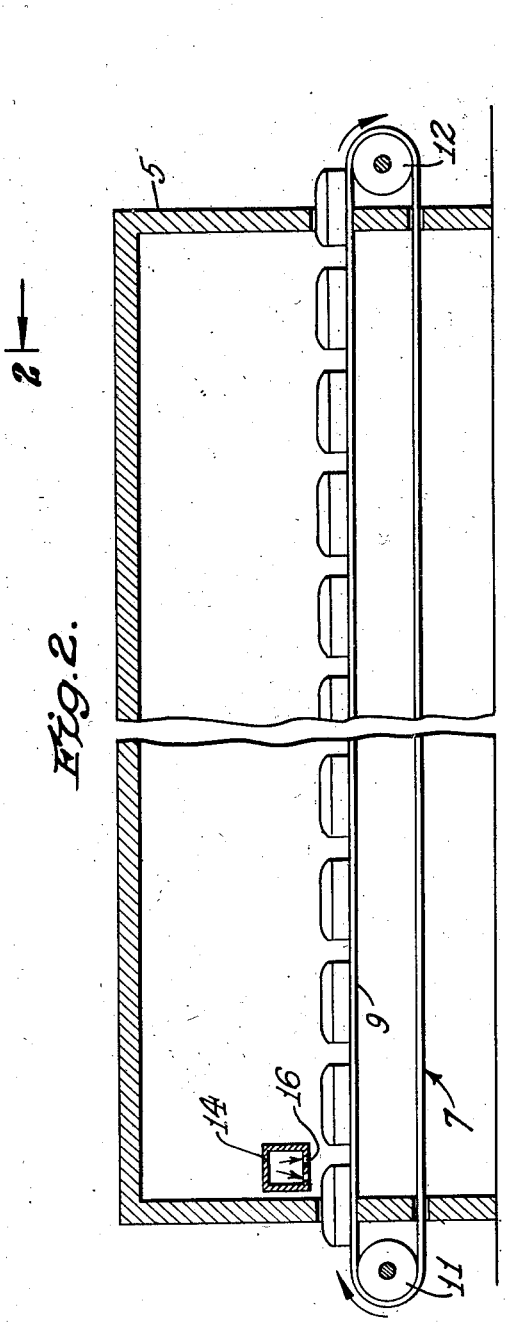

2,502,172

UNITED STATES PATENT OFFICE 2,502,172

AIR-CONDITIONED BAKERY OVEN

Edward H. Paulsen, Sea Girt, N. J., assignor, by mesne assignments, to Edward H. Paulsen, White Plains, N. Y.

Application November 14, 1945, Serial No. 628,422

2 Claims. (Cl. 107—64)

This invention relates to a means for producing and maintaining atmospheric conditions in a bakery oven which will promote the condensation of water vapor on the surface of the dough and which in turn will cause gelatinization of the starch.

The broad general object of this invention is to improve the texture of the bread by providing a better control of the rising of the bread in the oven, and to produce a crispy brown and crusty top crust.

This effect can be obtained to a degree by applying water to the top surface of the dough with a brush before putting it into the oven. It is often done this way by the housewife when she makes one or two loaves of homemade bread, and it is also done by the small baker. In large commercial operations, however, where a manual operation of this kind would interfere with production, attempts have been made to get the same results by creating a moist atmosphere in the oven.

In accordance with one method a moist atmosphere is provided in the oven by forcing steam into the oven through small holes in one or more distributor pipes. This method has been found unsatisfactory because the steam entering the oven is considerably lighter than the air in the oven though the air has been heated to about 450° F., and as a result much of the steam rises to the top of the oven and never comes into contact with the dough. Moreover, the superheat in the steam and the latent heat of the steam must be removed by the dough before condensation can take place, and in traveling ovens the temperature of the dough rises above the dew point of moist air in the oven in a comparatively short time.

In accordance with another method, oven air at 450° F. is recirculated and atomized water is mixed with the air. Some of the water is evaporated and forms steam. It has been found that the moist air should have a dew point of about 200° F. With the dough entering the oven at about 90° F. the temperature gradient which causes the flow of heat from the moist air to the dough which in turn causes the condensation is about 110° F. The lower the dew point, the lower is this temperature gradient, and the slower is the condensation. It is impossible to use recirculated oven air at a temperature of 450° F. to supply the heat required to evaporate sufficient water to saturate the air at 200° F.

The main objects of this invention are to provide a means for mixing air and steam and introducing the resulting mixture into the oven at an entering temperature at which the mixture is at least as dense as the oven air. In this way the mixture has less tendency to rise to the top of the oven, and the vapor condenses as soon as it strikes the dough. Results obtained by this method show a greatly improved crust with considerably reduced steam consumption.

Other objects of this invention will appear from the following description taken in connection with the drawings in which Figure 1 is a vertical section taken transversely of the oven and longitudinally of the air conditioning and saturating means; and Figure 2 is a longitudinal vertical section of the oven on line 2—2 of Figure 1.

For the purpose of disclosing this invention I have illustrated an oven 5, Figures 1 and 2, which may be provided with any suitable conveyor means 7 extending beyond the front and rear ends of the oven. This conveyor may comprise a belt 9 passing over pulleys 11 and 12, suitably supported in journals, not disclosed, and it may be assumed that the conveyor is driven in the direction of the arrows, Figure 2. Suitable means, not disclosed, is provided for heating the oven to the required temperature, say 450° F.

The dough as it enters the oven is preferably at a temperature of about 90° F.

For the purpose of conditioning the air within the oven so as to cause the dough to be covered by the condensation of moisture, a distributing pipe 14 is located in the oven adjacent to the entrance end of the oven and directly above the conveyor. This distributing pipe is provided in its lower wall with holes 16 through which the conditioned mixture of air and steam is freely delivered and directed downwardly upon the upper face of the dough. The distributing pipe is so positioned that it also shields the dough, as it enters the oven, against the intense heat of the oven.

The mixture of air and vapor delivered into the oven should have a dew point of about 200° F. With the dough entering the oven at about 90° F., the temperature gradient which causes the flow of heat from the mixture to the dough and which in turn causes the condensation is sufficiently ample for this purpose.

A preferred means for preparing this mixture of air and vapor is disclosed in Figure 1. It comprises a chamber 20 connected at one end to the distributing pipe 14 and connected at its other end with a blower or fan F, driven by a motor M. Means is provided to control the amount of air directed into the chamebr 20. This may be accomplished by using a motor of the variable speed type, or a damper, or other suitable means.

Steam is admitted into the chamber 20 through a pipe 22, the end of which may be bell-mouthed as indicated at 24, to cause the steam to spread as it enters the chamber to provide for a more uniform mixture of steam and air. The pipe 22 is provided with any suitable form of valve operated by a hand wheel 26 by means of which the amount of steam delivered into the chamber 20 may be controlled. Proper mixtures by volume of air and steam may be obtained by changing the relative amounts of air and steam directed into the chamber.

The mixture of air and steam on its way to the distributing pipe 14 passes through a cooling coil 28, and for the purpose of controlling the amount of cooling liquid passing through the coil, the feeding pipe 30 is provided with a valve controlled by a hand wheel 32. By the proper adjustment of the valve the mixture of steam and air may be cooled to the saturation temperature as it flows into the distributing pipe 14.

By means of the construction disclosed vapor saturated air at atmospheric pressure is introduced into the oven without change, and because of the direction in which it is introduced and the weight of the saturated air the moisture condenses upon the relatively cool dough as it enters the oven, covering it uniformly and at a point where the dough first enters the oven.

While I have described a preferred means for carrying out my invention, it is to be understood that this has been done merely for the purposes of disclosure and is not to be considered limiting, and I reserve the right to all such changes in the method and the means as fall within the principle of this invention and the scope of the appended claims.

I claim:

1. In combination with an oven, a continuous conveyor for conveying dough into, through, and out of the oven, means for preparing a mixture of air and water vapor at atmospheric pressure, said mixture having a dew point temperature higher than that of the dough entering the oven and a dry bulb temperature below 212° F., and means for conveying said mixture at said pressure and said dry bulb temperature over the dough at the entrance end of the oven.

2. In combination with an oven, a continuous conveyor for conveying dough into, through, and out of the oven, means for preparing a mixture of air and water vapor at atmospheric pressure, said mixture having a dew point temperature higher than that of the dough entering the oven and a dry bulb temperature below 212° F., and means for conveying said mixture at said pressure and said dry bulb temperature over the dough at the entrance end of the oven, said means including a distributing pipe in the oven adjacent the entrance end and provided with downwardly directed holes.

EDWARD H. PAULSEN.

REFERENCES CITED

The following references are of record in the file of this patent:

UNITED STATES PATENTS

| Number | Name | Date |
|---|---|---|
| 165,813 | Foerster | July 20, 1875 |
| 1,169,023 | Embrey | Jan. 18, 1916 |
| 1,393,086 | Carrier | Oct. 11, 1921 |
| 1,567,031 | Buensod | Dec. 29, 1925 |
| 1,819,251 | Crawford et al. | Aug. 18, 1931 |
| 1,878,519 | Petersen | Sept. 20, 1932 |
| 2,059,874 | Jones | Nov. 3, 1936 |
| 2,073,221 | Reece et al. | Mar. 9, 1937 |
| 2,141,591 | Bonner | Dec. 27, 1938 |
| 2,143,505 | Arnold | Jan. 10, 1939 |
| 2,215,193 | Reece | Sept. 17, 1940 |

OTHER REFERENCES

"Drying and Processing of Materials by Means of Conditioned Air" by Carrier Engineering Corp., 1929.